(12) United States Patent
Prabhu et al.

(10) Patent No.: US 11,429,740 B2
(45) Date of Patent: Aug. 30, 2022

(54) FAST QUERYING OF ENCRYPTED DATA SET

(71) Applicant: INTUIT INC., Mountain View, CA (US)

(72) Inventors: Prasada Laxminarayan Prabhu, Bangalore (IN); Mark Joseph Hughes, San Diego, CA (US); Ravindra Kulkarni, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 156 days.

(21) Appl. No.: 16/884,003

(22) Filed: May 26, 2020

(65) Prior Publication Data
US 2021/0374268 A1    Dec. 2, 2021

(51) Int. Cl.
*G06F 21/62* (2013.01)
*G06F 16/14* (2019.01)
*G06F 21/60* (2013.01)
*G06F 21/78* (2013.01)

(52) U.S. Cl.
CPC ........ *G06F 21/6227* (2013.01); *G06F 16/148* (2019.01); *G06F 16/156* (2019.01); *G06F 21/602* (2013.01); *G06F 21/78* (2013.01)

(58) Field of Classification Search
CPC .... G06F 21/6227; G06F 21/602; G06F 21/78; G06F 16/148; G06F 16/156; G06F 16/21; G06F 16/23; G06F 16/25; G06F 16/31
See application file for complete search history.

(56) References Cited

U.S. PATENT DOCUMENTS

| 8,843,997 B1* | 9/2014 | Hare | H04L 63/0815 |
| | | | 709/200 |
| 2010/0161957 A1* | 6/2010 | Chang | H04L 9/00 |
| | | | 707/E17.014 |
| 2012/0078914 A1* | 3/2012 | Roeder | G06F 16/316 |
| | | | 707/741 |

(Continued)

OTHER PUBLICATIONS

"Create, read, update and delete", https://en.wikipedia.org/wiki/Create,_read,_update_and_delete, May 25, 2020. 2 pages (Year: 2020).*

(Continued)

*Primary Examiner* — Carl G Colin
*Assistant Examiner* — Han Yang
(74) *Attorney, Agent, or Firm* — DLA Piper LLP (US)

(57) ABSTRACT

An encrypted database system includes a memory storing a database comprising a plurality of logical structural elements each respectively including an unencrypted fuzzed value and encrypted sensitive data formed by encrypting a sensitive data value. The system also includes a processor in communication with the memory and configured to form the plurality of logical structural elements and store the plurality of logical structural elements in the memory. Forming a logical structural element comprises generating the unencrypted fuzzed value for the sensitive data value, encrypting the sensitive data value, and storing the encrypted sensitive data value and the unencrypted fuzzed value in the same logical structural element in the database. The unencrypted fuzzed value is within a predetermined value range and is different from the sensitive data value.

18 Claims, 6 Drawing Sheets

(56) References Cited

U.S. PATENT DOCUMENTS

| | | | |
|---|---|---|---|
| 2012/0158734 A1* | 6/2012 | Chang | G06F 21/62 |
| | | | 707/E17.049 |
| 2016/0285623 A1* | 9/2016 | Yoon | G06F 21/6236 |
| 2019/0147770 A1* | 5/2019 | Yoshino | G06F 21/78 |
| | | | 713/193 |

OTHER PUBLICATIONS

International Search Report dated Aug. 18, 2021 issued in PCT/US2021/033047.

Written Opinion dated Aug. 18, 2021 issued in PCT/US2021/033047.

Poddar et al. "Arx: A Strongly Encrypted Database System", IACR, International Association for Cryptologic Research, vol. 20160607:201616, pp. 1-20, Jun. 6, 2016.

Arciszewski "Building Searchable Encrypted Databases with PHP and SQL—Paragon Initiative Enterprises Blog", Jun. 7, 2017, https://web.archive.org/web/20170607093853/https://paragonie.com/blog/2017/05/building-searchable-encrypted-databases-with-php-and-sql, retrieved on Nov. 8, 2018, 12 pages.

Hacigumus et al. "Executing SQL over encrypted data in the databse-service-provider model", Proceedings of the ACM SIGMOD International Conference on Management of Data, pp. 216-227, Jun. 3, 2002.

\* cited by examiner

FAST QUERYING OF ENCRYPTED DATA SET

BACKGROUND OF THE DISCLOSURE

Sensitive data, such as private user data like user date of birth, address, income, etc., is often stored in databases. To protect the sensitive data from unauthorized access, the sensitive data is often stored in an encrypted state. Authorized users who have the appropriate credentials can request the data (e.g., using an online analytical system or other data access frontend), decrypt the data, and read or otherwise use the data. When providing an online analytical system for use by authorized data users to work with sensitive data, there are challenges faced in providing speed of query execution and still maintaining confidentiality and integrity of the data. The most expensive part of querying a large data set that contains highly sensitive information is the decryption operation required to know if a particular portion of the data set satisfies the query predicates or not. For example, when a data user queries the data with filtering criteria based on a sensitive field (e.g., date of birth), the database query engine reads the data from the storage tier and then decrypts each field to evaluate it against the query predicate. However, in a search such as this, the location(s) of matching data are unknown, so each row of data within the database is decrypted and evaluated. Accordingly, the number of decryption operations is proportional to the number of rows in the data set, making this a time consuming and processing-intensive operation.

DETAILED DESCRIPTION OF SEVERAL EMBODIMENTS

Embodiments described herein maintain database contents in an encrypted state while providing fast searching capabilities that do not require mass decryption to facilitate query investigation. By essentially indexing the encrypted data and storing the index in an unencrypted column while not leaking too much information about the underlying data, a number of decrypt operations is drastically reduced. This "indexing" is achieved by applying fuzzing (a non-deterministic operation) on a sensitive value to produce a new value that is persisted, unencrypted, in the same logical structural element (e.g., same row) of the database as the encrypted sensitive value. Additionally, a slight change is applied to read queries fired against the database, causing a query for a specific sensitive value to be evaluated against the "fuzzed" new value. For example, a fuzzing operation may take the original sensitive value and a configuration parameter of max and min fuzzing which may generate a new fuzzed value that will be in the range of specified fuzzing. The fuzzed value does not reveal the sensitive value, and the sensitive value cannot be recovered from the fuzzed value. Databases using the embodiments described herein can maintain data security through encryption while providing the technical advantage of high-speed querying with vastly reduced decryption operations.

For example, consider a database storing sensitive personal data about users of a tax preparation program. The data set stored in the database may contain millions of rows as separate logical structural elements for every user. In some cases, analysts may need to identify particular users based on one or more user characteristics. For example, analysts may need to identify users who were at least 59.5 years of age on a particular date. To identify users having a given characteristic, the analyst may query the database with an appropriate query. If a column is encrypted without fuzzing, the query will fetch every single row and decrypt the row to see if the row satisfies the condition. Embodiments described herein significantly reduce the number of decrypt operations by storing fuzzed clear text values of the users' dates of birth and formulating the query to search the fuzzed values. The following detailed description provides technical implementation details for realizing such improvements.

Figure 1:
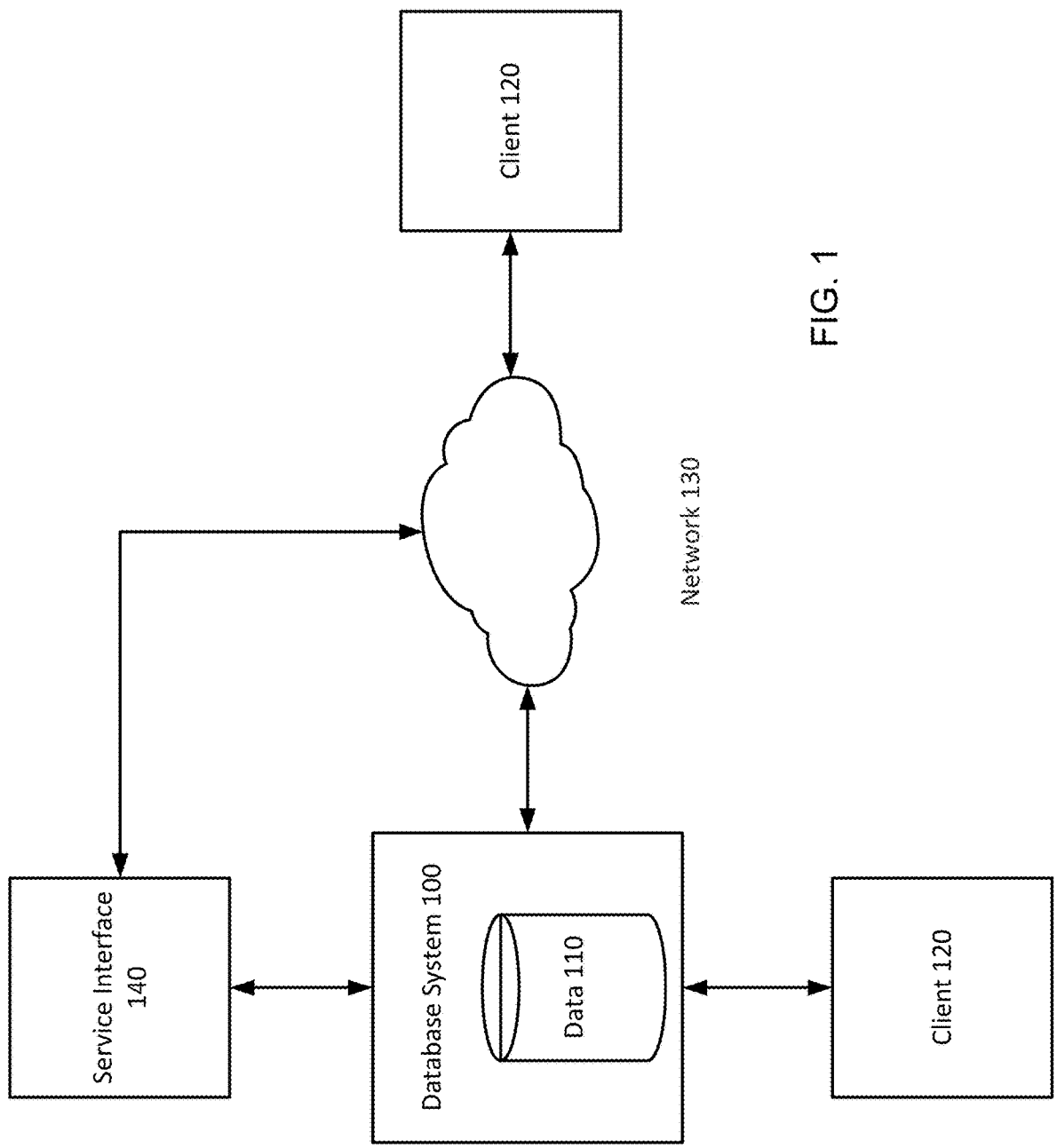
FIG. 1 shows a database system and computing environment according to an embodiment of the present disclosure.
Figure 6:
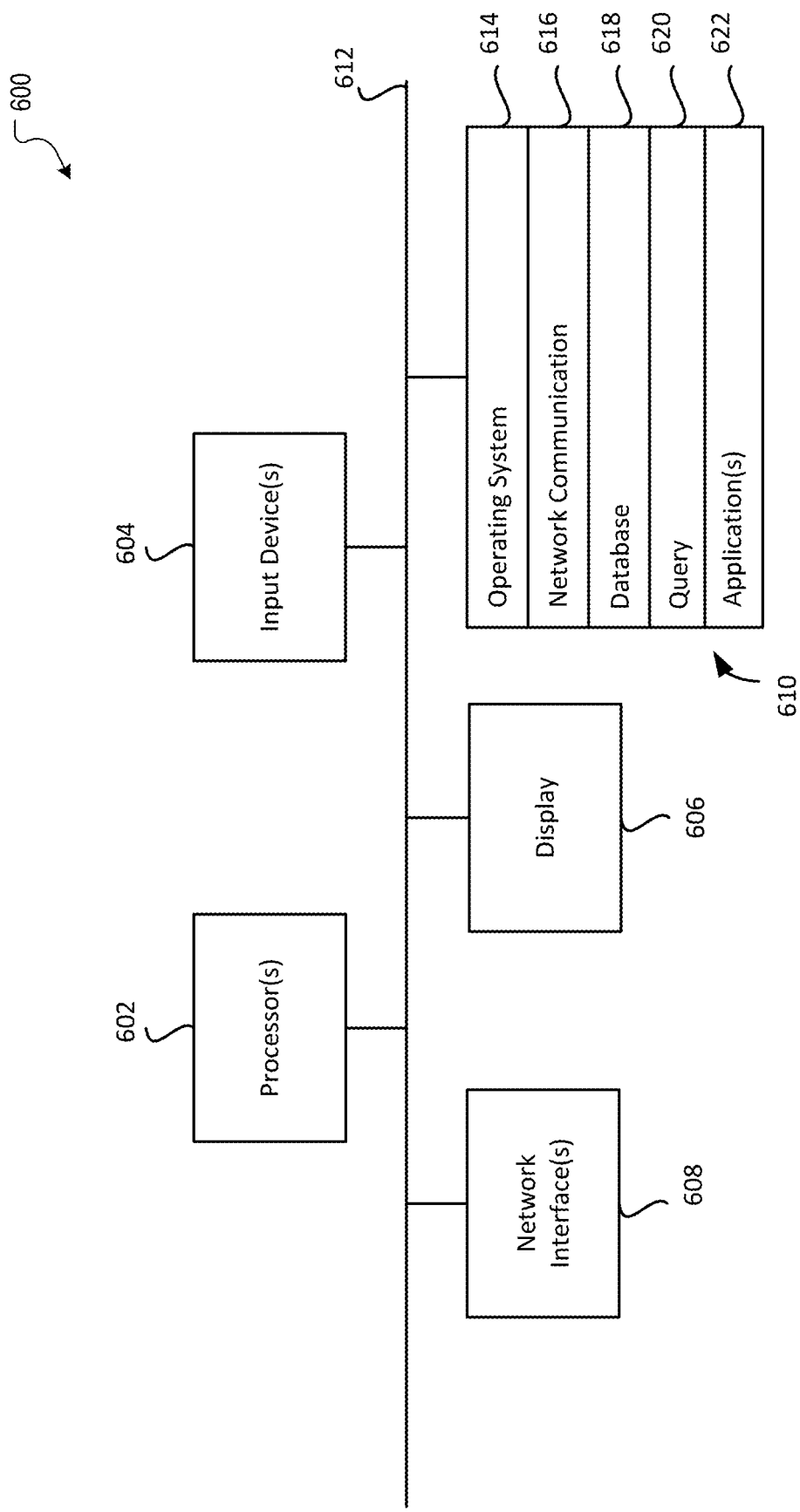
FIG. 6 shows a computing device according to an embodiment of the present disclosure.

FIG. 1 shows a database system 100 and computing environment according to an embodiment of the present disclosure. Database system 100 may include one or more computers and/or data storage devices configured to store data 110. Database system 100 may store data 110 in logical structural elements such as table entries, where each of the logical structural elements respectively store data that is interrelated in some way. For example, a table may be configured so that each column contains data of a particular category (e.g., name, date of birth, age, address, income, etc.), and each row pertains to a particular data entry (e.g., each respective row contains data for a particular respective user). This arrangement of logical structural elements is presented as an example only, and one of ordinary skill in the art will appreciate that other arrangements may be possible (e.g., tables where columns pertain to particular data entries and rows indicate category, arrangements wherein particular data entries are stored as individual separate files, arrangements wherein particular data entries are stored as individual separate blocks, etc.). Data 110 may include any type of information, but at least some of the data 110 is stored in encrypted form within memory and/or other persistent storage of database system 100. Moreover, as described in detail below, at least some of the data 110 is unencrypted fuzzed data that may be used to facilitate fast querying of the data 110 stored in encrypted form. FIG. 6, described in detail below, shows an example configuration for the one or more computers of database system 100.

In some embodiments, database system 100 may perform processing related to fuzzing data and/or performing queries as described herein. In other embodiments, a separate service interface 140 may perform some or all of the processing related to fuzzing data and/or performing queries as described herein. Service interface 140 may include one or more computers such as those illustrated by FIG. 6 and described in detail below, or service interface 140 may be a separate layer, program, or component of a computer that also hosts database system 100. Embodiments wherein service interface 140 is separate from database system 100 may require security measures to be in place for secure in-transit connections between service interface 140 and database system 100 in order to maintain confidentiality and integrity of the data in database system 100. Any security measures applicable to network data transfer and available to those of ordinary skill in the art may be employed to maintain confidentiality and data integrity.

The computing environment may include one or more clients 120 in communication with database system 100, service interface 140, and/or one another through a network 130 and/or through a direct connection with database system 100. Network 130 may include any public and/or private network, such as the Internet. Clients 120 can be configured to submit information for storage by database system 100 and/or to run queries against data 110 stored by database system 100 as described in detail below. FIG. 6, described in detail below, shows an example configuration for one or more computers functioning as clients 120. Many embodiments may require security measures to be in place for secure in-transit connections between client 120 and database system 100 in order to maintain confidentiality and integrity of the data in database system 100. Any security measures applicable to network data transfer and available to those of ordinary skill in the art may be employed to maintain confidentiality and data integrity.

These systems are illustrated as separate components in the example of FIG. 1, but in some embodiments, each system (or some of the systems) may collectively be elements of a single device and/or may be coupled to one another by direct connections rather than by network 130. Likewise, in some embodiments, each system (or some of the systems) may be distributed among multiple devices.

Figure 2:
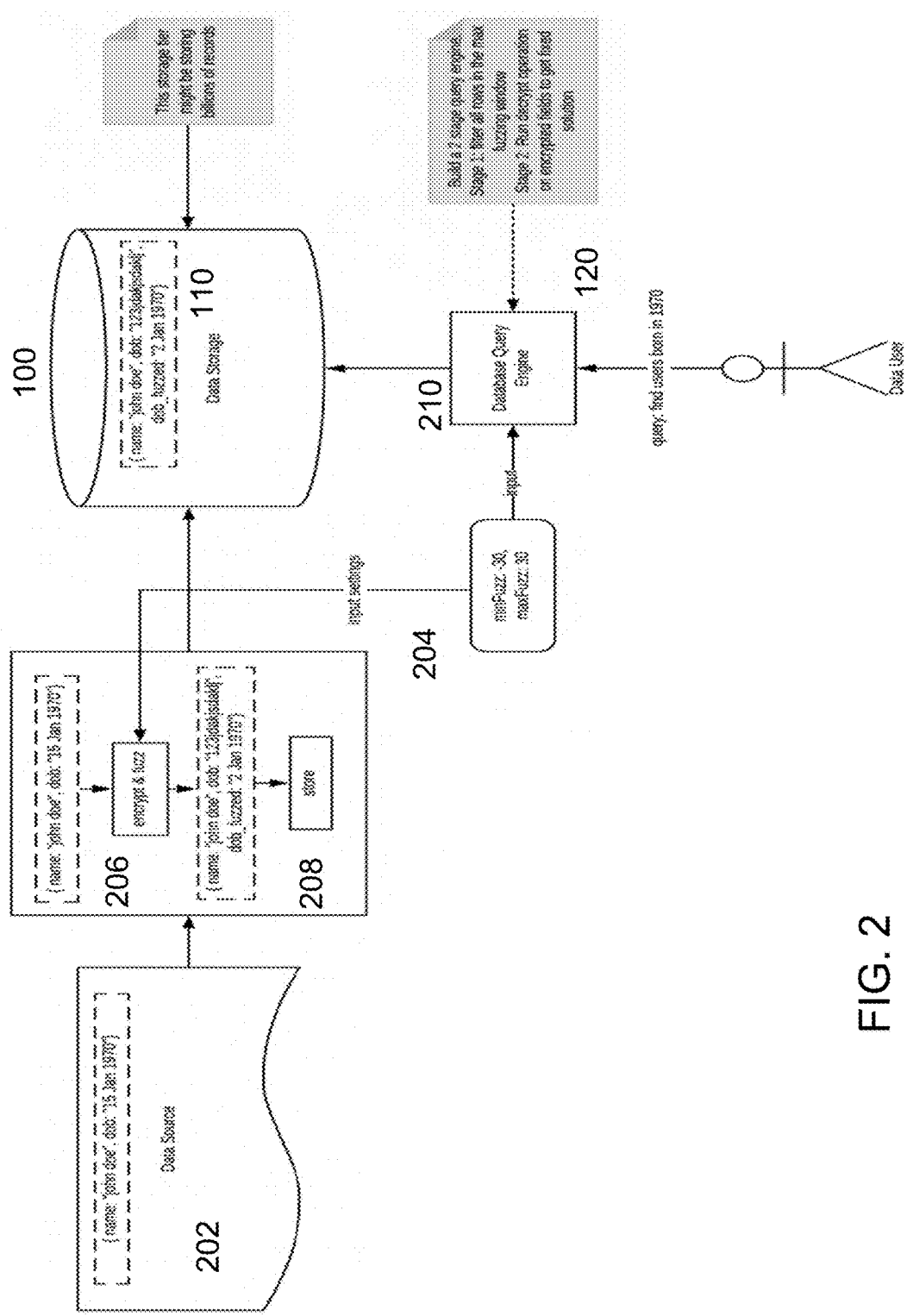
FIG. 2 shows a database storage and query solution according to an embodiment of the present disclosure.

FIG. 2 shows a database storage and query solution 200 according to an embodiment of the present disclosure, illustrating how database system 100 can function to provide secure data storage and fast querying thereof. Data 110 may include billions of records, as in this example, and each record includes encrypted data. To enable efficient searching of the database, when data is first entered at 202, a fuzzing range 204 is applied thereto at 206 to create fuzzed data. The actual data is encrypted, and the encrypted data and fuzzed data are stored together in a logical structural element at 208. The details of this process are described below with respect to FIGS. 3 and 4.

At this point, the logical structural element stored at 208 is available for searching within database system 100. A user may formulate a query (e.g., at client device 120), and the query can be fired against data 110 at 210. For example, this may be a multi-stage query where the specific value of interest to the user is fuzzed, and logical structural elements having unencrypted portions matching the fuzzed range may be identified. Then, encrypted data within these logical structural elements may be decrypted and checked for the value of interest. The details of this process are described below with respect to FIG. 5.

Figure 3:
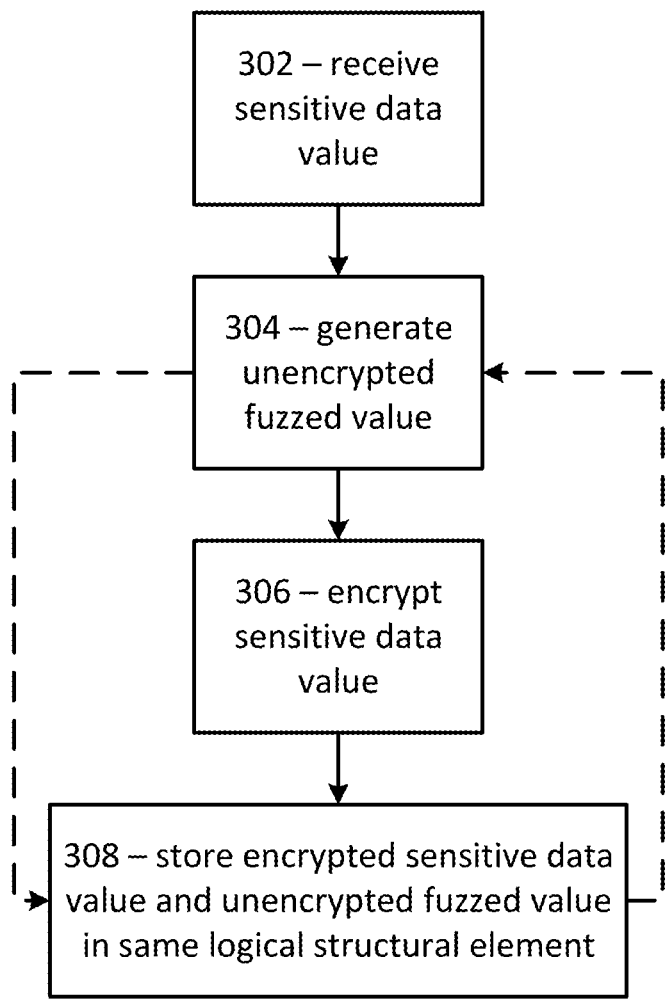
FIG. 3 shows sensitive data storage processing according to an embodiment of the present disclosure.

FIG. 3 shows sensitive data storage processing 300 according to an embodiment of the present disclosure. Database system 100 and/or service interface 140, in some embodiments in combination with client 120, may perform sensitive data storage processing 300 to store encrypted data and fuzzed data together in a logical structural element and thereby enable fast searching of data 110.

At 302, database system 100 may receive data including at least a sensitive data value to be stored. In some cases, the data may come from client 120 (for example when a user is submitting data for storage by database system 100 and/or when database system 100 is scraping data from an external source held by client 120). In some cases, the data may come from within database system 100 itself (for example, database system 100 may reformulate encrypted sensitive data already stored therein to include a combination of both the original encrypted sensitive data and unencrypted fuzzed data). In other cases, data may come from some other source.

The sensitive data value may be of one or more data types that are capable of being fuzzed. Data types are a way of expressing how a system deals with a specific set of bytes. Data types may include familiar abstractions such as string, BLOB, integer, and/or floating-point number. Data types may allow both computers and humans to infer information about the data without having to know specifics of the data. For example, a human need not know which bits are the significand, exponent, or mantissa to add two floating point numbers together; the human may simply use their familiarity with floating point numbers (i.e., the data type) to make the calculation. In similar fashion, computers may be able to quickly triage and/or employ data based on its data type without regard to the specific contents of the data, as described in detail below.

Moreover, the sensitive data value may have a particular data ontology. As used herein, data ontology describes the classification of data by its nature (what is the data, e.g., date, age, income level, etc.) as opposed to its data type (how it is stored, e.g., integer, string, etc.). Data ontology may not necessarily indicate that a certain datum is sensitive. For example, a date could be a timestamp, it could be a date of birth (highly sensitive, and must be encrypted), or it could be the time of the first pitch of Game 1 on the 1986 World Series. Defining the data is therefore a matter of ontology and classification (e.g., sensitive or not).

Accordingly, in addition to receiving data itself, database system 100 may further receive an indication of whether the data is sensitive data and/or the type of sensitive data. For example, if a user is supplying data by client 120, client 120 may provide an interface allowing the user to tag or otherwise indicate sensitive data as such. In another example, any data in a particular column of a table or field of a form may be automatically labeled as sensitive data (e.g., a table entry or form field for "income" may be automatically sensitive). In any case, database system 100 may obtain both sensitive data and an indication that the data is sensitive.

At 304, database system 100 and/or service interface 140 may generate an unencrypted fuzzed value for a sensitive data value. The unencrypted fuzzed value may be within a predetermined value range from the sensitive data value and different from the sensitive data value. For example, for a sensitive data value of 100, database system 100 may use a pseudorandom number generator to select a fuzzed value between 90-110, exclusive of 100. The unencrypted fuzzed value is a value different from the sensitive data value to avoid the sensitive data value being stored unencrypted in the database (e.g., 100 being selected at random and stored in the clear, thereby "revealing" the encrypted value through coincidence).

In some cases, fuzzing range may be specified by a user (e.g., by a database administrator or by a user entering the data for storage in the database) or, in other cases, may be specified automatically. In some cases, the fuzzing range may be selected based on the contents of the data. For example, for date of birth, the fuzzing range may be +/−1 month. For salary, the fuzzing range may be +500/−50 dollars (an asymmetric range) or +500/−500 dollars (a symmetric range). These ranges are presented as examples only. Other data may have other ranges, and date of birth and/or salary may be given other ranges than these in various embodiments. Generally, ranges can be thoughtfully considered and customized with respect to the security and/or privacy needed for a particular data type and the impact of the fuzzing on runtime performance for a given application.

The security of the underlying table data should not be compromised if appropriate max and min fuzzing value are picked. If the fuzzing factor is 1 or 0, it becomes easy to guess what the underlying value is, providing very little security. Conversely, picking a large ranged fuzz value will provide extremely high security but will proportionately slow down query execution. Accordingly, in some embodiments the fuzz values may be selected by an expert user or by an automatic process (e.g., a machine learning analysis or a rule traversal) depending on the data. As a guideline, for data that is extremely dense within a column, a small fuzz factor can provide sufficient security. Dense data may be data that ranges only within a small range (e.g., all individuals having records in a given dataset are in high school, so the age range is 14-18). If the data is sparser, then larger fuzz ranges may be employed.

One example generic fuzzing algorithm, which may be applied to any numeric value, may include adding a pseudorandom number to the numeric value or subtracting the pseudorandom number from the numeric value. This may be represented in pseudocode as follows:

```
type fuzzing_function(type originalValue, float minFuzz, float maxFuzz) {
    //Call a random number generated that generates values between the min and
max values of the fuzzing range
    float fuzz = generateRandomValueBetween(minFuzz, maxFuzz);
    //add the fuzz value to original value. The fuzz might include negative value if a
negative minFuzz value is chosen.
    // the add function here represents the addition operation appropriate to the type
(e.g., numeric)
    type fuzzedValue = add(originalVal, fuzz);
    return fuzzedValue;
}
```

A similar algorithm may be applied for more complex fuzzing, whereby the "add" function in the pseudocode above (a simple mathematic add in the example) may be replaced by an add function appropriate to the data. For example, if the sensitive data value is a date, then generating the unencrypted fuzzed value may include adding a number of days equal to the pseudorandom number to the date or subtracting the number of days equal to the pseudorandom number from the date to obtain a second date as the unencrypted fuzzed value.

In some embodiments, algorithms that generate fuzzing through approaches other than addition or subtraction may be used. For example, in the case of dense data with low cardinality and, especially, clustered cardinality, there is not much privacy when fuzzing using addition and/or subtraction because too much of the underlying value is ultimately "leaked." One example may be a case where all entries in the database have an "age" value between 14-18. Simply adding +/−1 or +/−2 to the ages results in a range of 13-19 or 12-20, respectively, and there are only a few values to "guess" among in order to determine the actual age. An example algorithm for use in these instances may be a "projection algorithm." For example, age could be projected into a far larger space, using an operation such as [POWER($value, ROUND(SQRT($value),0))]. A sample result may be in Table 1 as follows:

TABLE 1 projection of age into a larger numeric space

| Age | Projected Age | Difference between steps in age |
|---|---|---|
| 14 | 38416 | |
| 15 | 50625 | 12209 |
| 16 | 65536 | 14911 |
| 17 | 83521 | 17985 |
| 18 | 104976 | 21455 |

As can be seen in Table 1 above, projection algorithms can help deliver results to protect low cardinality by making their value spaces "larger." In other words, it may be more difficult to guess a true value from a range of projected fuzzed ages that is in excess of 100,000 than it is to guess a true value from a range of fuzzed ages that is on the order of 9 or 11.

In some embodiments, a plurality of data values designated for storage in the same logical structural element in the database may have been received at 302. In this case, database system 100 and/or service interface 140 may identify all of the data values that are tagged or otherwise designated as sensitive data values and perform fuzzing on those values. In embodiments wherein service interface 140 performs the fuzzing operations, the data for storage may be sent to service interface 140 directly from database system 100 and/or through network 130 by a secure connection. Then service interface 140 may perform the fuzzing described above and send the fuzzed data to database system 100 directly and/or through network 130 by a secure connection.

At 306, database system 100 and/or service interface 140 may encrypt all identified sensitive data values. For example, database system 100 may include instructions for performing encrypting or may leverage an extract, transform, load (ETL) process or other available pipeline and/or process for encryption that may be known to those of ordinary skill in the art. In some embodiments, the ETL process may be hosted and/or performed by a computer external to database system 100, such as service interface 140, with the encrypted result being sent to database 100 directly or through network 130. Database system 100 may also encrypt other data received at 302 but not specified as sensitive data. For example, the data may have included "Name: James Bond; ID: 007; Salary: $200,000." The salary entry may have been tagged as sensitive data and fuzzed. However, even though the name and ID were not tagged and not fuzzed, they may also be encrypted, to ensure that all data entered into the database is secure.

At 308, database system 100 may store the encrypted data and the unencrypted fuzzed value(s) in a same logical structural element in the database. For example, if the database is in a tabular form, all of the data (e.g., encrypted name, encrypted ID, encrypted salary, unencrypted fuzzed salary) related to a single entry is stored in a single row of the table. In some embodiments, database system 100 may further store an indication of the predetermined fuzzed value range in the database. Thus, when attempts to query the database are made (e.g., as in FIG. 5, described below), the querying computer may use the indication to formulate a query against the fuzzed values stored in the database.

As shown by the dashed lines in FIG. 3, database system 100 may occasionally change the unencrypted fuzzed values, for example to expand or contract the fuzzing range. In this case, for a given sensitive data value, database system 100 may decrypt the sensitive data value, generate an updated unencrypted fuzzed value for the decrypted sensitive data value (possibly within a different predetermined value range, or possibly using the same range, but in either case still different from the decrypted sensitive data value), and replace the unencrypted fuzzed value by the updated unencrypted fuzzed value in the same logical structural element in the database.

Figure 4:
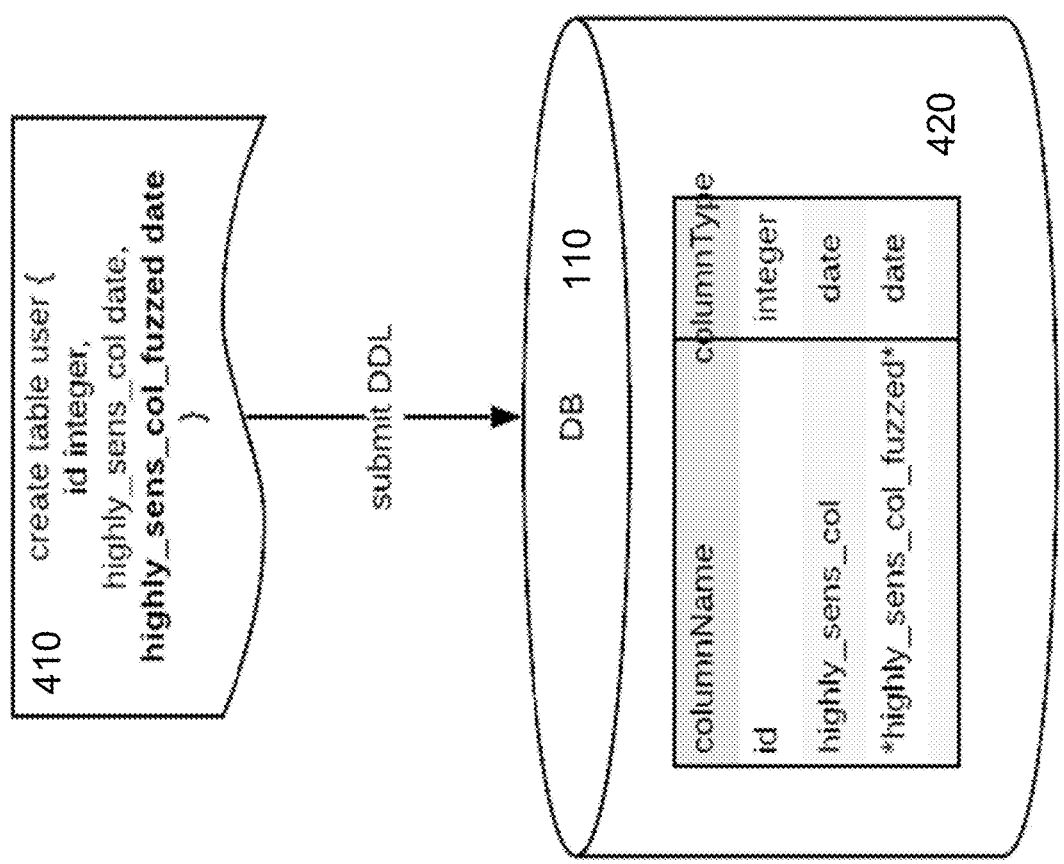
FIG. 4 shows a database storage example according to an embodiment of the present disclosure.

FIG. 4 shows a database storage example (i.e., an example of step 308 described above) according to an embodiment of the present disclosure. As shown in this example, a table entry may include an ID integer and a sensitive date (e.g., a date of birth). These two data may be encrypted, and a fuzzed date may be added to them in the table entry. This set of data may be stored in data 110 of database system 100 in a single logical structural element 420, as illustrated. In this table example, the fuzzed entry is inserted into a column in the table constructed for that purpose.

Figure 5:
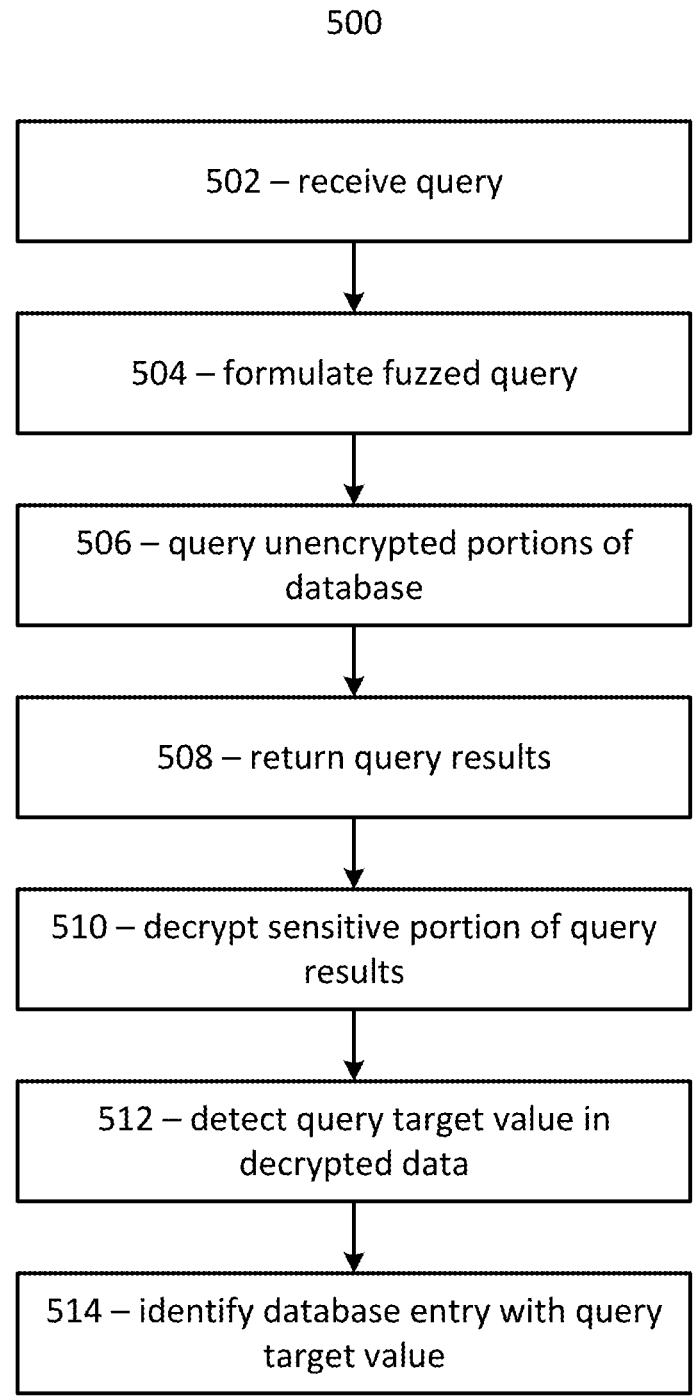
FIG. 5 shows query processing according to an embodiment of the present disclosure.

FIG. 5 shows query processing 500 according to an embodiment of the present disclosure. Database system 100 service interface 140, and/or client 120 may perform query processing 500 to query data 110 in database system 100 that has been prepared to have encrypted data and fuzzed data stored together in logical structural elements (for example as described above with respect to FIGS. 3-4).

At 502, database system 100 or client 120 receives a query. For example, a user may enter, through a user interface, a request for data that is an exact match to a query target value or a request for data that is within a given range. As a specific example of an exact match for illustration purposes, the user may request all records with a birthdate entry of Feb. 10, 1972. If the query were to be run at this stage, without additional formatting described below, it may be represented in pseudocode as follows:

Select id, highly_sens_col from table where decrypt(highly_sons_col)='10 Feb. 1972'

At 504, database system 100, service interface 140, or client 120 may formulate a query comprising a value range defined by a lower value bound and an upper value bound between which a query target value lies. For example, starting with the query target value from the query at 502, the database system 100, service interface 140, or client 120 can designate a predetermined range corresponding to the sensitive data type as the value range. In some embodiments, client 120 may send a user generated query from 502 to database system 100 or service interface 140, which may formulate the query to search the fuzzed data. A formulated version of the query, taking the fuzzing range for the query target value into account, may be represented in pseudocode as follows:

```
Select id, highly_sens_col from table where decrypt(highly_sens_col) = '10 Feb 1972'
and ( highly_sens_col_fuzzed < add('10 Feb 1972', MAX_FUZZ) and
highly_sens_col_fuzzed > add('10 Feb 1972', MIN_FUZZ) )
``` where "highly_sens_col_fuzzed" is the fuzzing range for birthdates.

Formulating the query may include retrieving, from the database or another memory source, the predetermined range associated with the sensitive data type. For example, birthdates may have been stored with fuzzing ranges of +/−1 month. A definition of the fuzzing range for birthdates may also have been stored. Accordingly, when the query request at 502 is for a birthdate, the appropriate range for the birthdate is used to formulate the query at 504.

For a range search operation, where the query request at 502 is for data between the range "LITERAL_MIN" and "LITERAL_MAX," the original query without additional formatting may be represented in pseudocode as follows:

```
Select id, highly_sens_col
from table
where decrypt(highly_sens_col) > 'LITERAL_MIN' and decrypt(highly_sens_col) <
'LITERAL_MAX'
```

After formulating to account for the fuzzing range, the query may be represented in pseudocode as follows:

```
Select id, highly_sens_col
from table
where
( highly_sens_col_fuzzed > add('LITERAL_MIN', MIN_FUZZ) and
highly_sens_col_fuzzed < add('LITERAL_MAX', MAX_FUZZ) )
AND
decrypt(highly_sens_col) > 'LITERAL_MIN' and decrypt(highly_sens_col) <
'LITERAL_MAX'
```

At 506, database system 100 and/or service interface 140 may query unencrypted portions of the database using the query formulated at 504. As described above, the database comprises a plurality of logical structural elements each respectively including one of the unencrypted portions of the database (i.e., the fuzzed values) and encrypted sensitive data (i.e., the true data that is the subject of the user query). Database system 100 can run the query from 504 against the unencrypted fuzzed data without decrypting any of the encrypted data, thereby avoiding the necessity of a decryption step in order to query the data 110.

At 508, in response to the querying and assuming at least one match is found, database system 100 may return a subset of the logical structural elements, where each respective returned logical structured element includes an unencrypted portion having an unencrypted fuzzed value within the value range from the query fired at 506.

At 510, database system 100 and/or service interface 140 may decrypt the encrypted sensitive data of each respective returned logical structured element. For example, database system 100 may include instructions for performing decrypting or may leverage an extract, transform, load (ETL) process or other available pipeline and/or process for encryption that may be known to those of ordinary skill in the art. In some embodiments, the ETL process may be hosted and/or performed by a computer external to database system 100, such as service interface 140, with the encrypted result being sent to database 100 either directly or through network 130. Note that only those elements that were returned at 508 are decrypted. In other words, the amount of decryption operations necessary to finish the query is drastically reduced in comparison with a query run against the base encrypted data set. For example, assume a 60 million row dataset with thousands of columns per row. A query run against the encrypted data would require decryption of each of the 60 million rows. A query run against the unencrypted fuzzed value will return only a small subset of the 60 million row dataset for decryption. Continuing the Feb. 10, 1972 date example, if 1% of the rows have a fuzzed date value within one month (in either direction) of Feb. 10, 1972, only 600,000 rows will be decrypted.

At 512, database system 100 and/or service interface 140 may determine that the decrypted sensitive data of at least one returned logical structured element includes the query target value. This may include searching the decrypted sensitive data for the query target value. Once the sensitive data has been decrypted, a query for the exact value (or specific range) from the query at 502 may be run against the decrypted sensitive data to determine actual matches. For example, database system 100 may search the 600,000 decrypted rows to find those rows that have "Feb. 10, 1972" entered in a "birthdate" column.

At 514, database system 100 may provide identifying information for each at least one returned logical structured element that includes the query target value as a response to the query.

Depending on the permissions of the user, sensitivity of the data, and/or other factors, in some cases database system 100 may return the query result itself in addition to other information. For example, in response to the above-described birthdate query, database system 100 may return "name" entries that were decrypted. Because the name entries are from logical structured elements with exact matches for the birthdate, the birthdate associated with the name may also be revealed.

In some cases, the identifying information for each at least one returned logical structured element may be stored in the returned logical structured element, but is different from the query target value. For example, in response to an income level query (e.g., a request to identify individuals having an income between $100,000 and $200,000 annually), the names, but not the actual income levels themselves, may be returned. This may protect the sensitive exact income value from being discovered by the querying user.

FIG. 6 shows a computing device 600 according to an embodiment of the present disclosure. For example, computing device 600 may function as database system 100, client 120, service interface 140, any combinations thereof, or any portions thereof. Computing device 600 may be implemented on any electronic device that runs software applications derived from compiled instructions, including without limitation personal computers, servers, smart phones, media players, electronic tablets, game consoles, email devices, etc. In some implementations, computing device 600 may include one or more processors 602, one or more input devices 604, one or more display devices 606, one or more network interfaces 608, and one or more computer-readable mediums 610. Each of these components may be coupled by bus 612, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. In some embodiments, some or all devices shown as coupled by bus 612 may not be coupled to one another by a physical bus, but by a network connection, for example. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

Database instructions 618 may include instructions that enable computing device 600 to store data in the database 618 (e.g., including the formulation of fuzzy data, the encryption/decryption of sensitive data, and/or the maintenance thereof in data structures of a database), and/or may include the stored data itself, as described herein. Query instructions 620 may include instructions that enable computing device 600 to query data in the database 618 as described herein. Application(s) 622 may be an application that uses or implements the processes described herein and/or other processes, for example applications used to provide the data storage and/or querying functionality described above. The processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of configuring an encrypted database comprising:
   generating, by a processor, an unencrypted fuzzed value for a sensitive data value, the unencrypted fuzzed value being within a predetermined value range and being different from the sensitive data value;
   encrypting, by the processor, the sensitive data value;
   storing, by the processor, the encrypted sensitive data value and the unencrypted fuzzed value in a same logical structural element in a database;
   formulating, by the processor, a query comprising a value range defined by a lower value bound and an upper value bound between which a query target value lies;
   querying, by the processor, the unencrypted fuzzed values using the query;
   in response to the querying, returning, by the processor, a subset of the logical structural elements, each respective returned logical structured element including an unencrypted fuzzed value within the value range;

decrypting, by the processor, the encrypted sensitive data of each respective returned logical structured element;

determining, by the processor, that the decrypted sensitive data of at least one returned logical structured element includes the query target value; and providing, by the processor, identifying information for each at least one returned logical structured element that includes the query target value as a response to the query.

2. The method of claim 1, further comprising generating, by the processor, a pseudorandom number, wherein:

the sensitive data value is a numeric value; and generating the unencrypted fuzzed value comprises adding the pseudorandom number to the numeric value or subtracting the pseudorandom number from the numeric value.

3. The method of claim 1, further comprising generating, by the processor, a pseudorandom number, wherein:

the sensitive data value is a date; and generating the unencrypted fuzzed value comprises adding a number of days equal to the pseudorandom number to the date or subtracting the number of days equal to the pseudorandom number from the date to obtain a second date as the unencrypted fuzzed value.

4. The method of claim 1, further comprising:

receiving, at the processor, a data entry including a plurality of data values designated for storage in the same logical structural element in the database;

identifying, by the processor, at least one of the plurality of data values as the sensitive data value;

encrypting, by the processor, the remaining plurality of data values not identified as the sensitive data value; and storing, by the processor, the encrypted remaining plurality of data values in the same logical structural element in the database with the encrypted sensitive data value and the unencrypted fuzzed value.

5. The method of claim 1, further comprising storing, by the processor, an indication of the predetermined value range in the database.

6. The method of claim 1, further comprising:

decrypting, by the processor, the sensitive data value;

generating, by the processor, an updated unencrypted fuzzed value for the decrypted sensitive data value, the updated unencrypted fuzzed value being within the predetermined value range and being different from the decrypted sensitive data value; and replacing, by the processor, the unencrypted fuzzed value by the updated unencrypted fuzzed value in the same logical structural element in the database.

7. The method of claim 1, wherein the formulating comprises:

receiving the query target value for a sensitive data type; and designating a predetermined range corresponding to the sensitive data type as the value range.

8. The method of claim 7, wherein the designating comprises retrieving, from the database, the predetermined range associated with the sensitive data type.

9. The method of claim 1, wherein each unencrypted portion of the database respectively comprises an unencrypted fuzzed value for the respective sensitive data value, each unencrypted fuzzed value being within a predetermined value range and being different from the respective sensitive data value.

10. The method of claim 9, wherein:

each respective sensitive data value is a numeric value; and each unencrypted fuzzed value is generated by adding a pseudorandom number to the respective numeric value or subtracting the pseudorandom number from the respective numeric value.

11. The method of claim 9, wherein:

each respective sensitive data value is a date; and each unencrypted fuzzed value is generated by adding a number of days equal to a pseudorandom number to the respective date or subtracting the number of days equal to the pseudorandom number from the respective date.

12. The method of claim 1, wherein the determining comprises searching the decrypted sensitive data for the query target value.

13. The method of claim 1, wherein the identifying information for each at least one returned logical structured element is stored in the returned logical structured element and is different from the query target value.

14. An encrypted database system comprising:

a memory storing a database comprising a plurality of logical structural elements each respectively including an unencrypted fuzzed value and encrypted sensitive data formed by encrypting a sensitive data value; and a processor in communication with the memory and configured to form the plurality of logical structural elements and store the plurality of logical structural elements in the memory, wherein forming a logical structural element comprises:

generating the unencrypted fuzzed value for the sensitive data value, the unencrypted fuzzed value being within a predetermined value range and being different from the sensitive data value;

encrypting the sensitive data value;

storing the encrypted sensitive data value and the unencrypted fuzzed value in the same logical structural element in the databases;

wherein the processor is further configured to query the database, the querying comprising:

formulating a query comprising a value range defined by a lower value bound and an upper value bound between which a query target value lies;

querying the unencrypted fuzzed values using the query;

in response to the querying, returning a subset of the logical structural elements, each respective returned logical structured element including an unencrypted fuzzed value within the value range;

decrypting the encrypted sensitive data of each respective returned logical structured element;

determining that the decrypted sensitive data of at least one returned logical structured element includes the query target value; and providing identifying information for each at least one returned logical structured element that includes the query target value as a response to the query.

15. The encrypted database system of claim 14, wherein the formulating comprises:

receiving the query target value for a sensitive data type; and designating a predetermined range corresponding to the sensitive data type as the value range.

16. The encrypted database system of claim 14, wherein:
the processor is further configured to generate a pseudorandom number;
the sensitive data value is a numeric value; and
generating the unencrypted fuzzed value comprises adding the pseudorandom number to the numeric value or subtracting the pseudorandom number from the numeric value.

17. The encrypted database system of claim 14, wherein:
the processor is further configured to generate a pseudorandom number;
the sensitive data value is a date; and
generating the unencrypted fuzzed value comprises adding a number of days equal to the pseudorandom number to the date or subtracting the number of days equal to the pseudorandom number from the date to obtain a second date as the unencrypted fuzzed value.

18. The encrypted database system of claim 14, wherein the processor is further configured to:
receive a data entry including a plurality of data values designated for storage in the same logical structural element in the database;
identify at least one of the plurality of data values as the sensitive data value;
encrypt the remaining plurality of data values not identified as the sensitive data value; and
store the encrypted remaining plurality of data values in the same logical structural element in the database with the encrypted sensitive data value and the unencrypted fuzzed value.

* * * * *